(No Model.) 2 Sheets—Sheet 1.
J. KENNEDY.
MANUFACTURE OF EYE BARS.
No. 395,239. Patented Dec. 25, 1888.
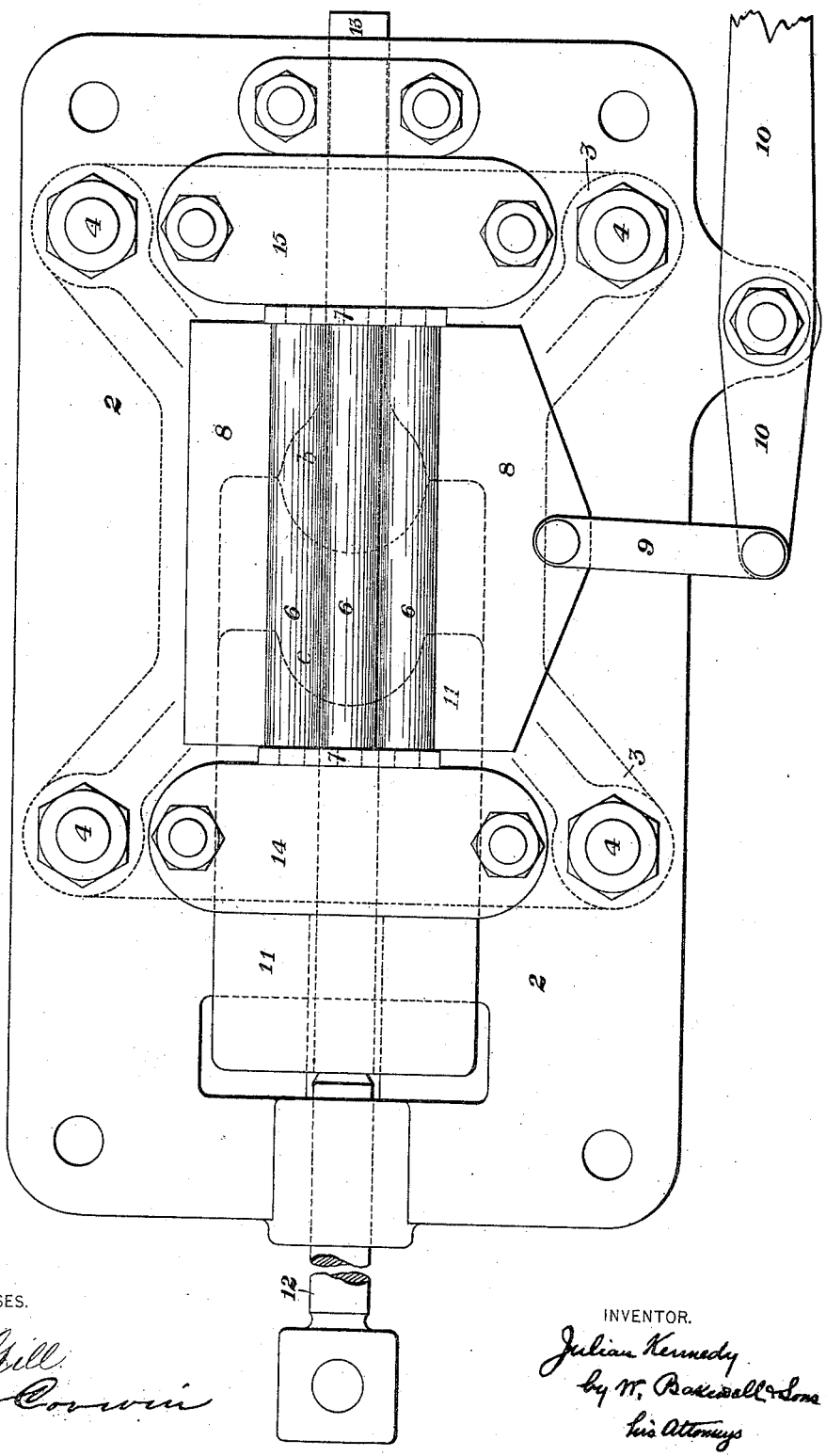
WITNESSES.
INVENTOR.

(No Model.) 2 Sheets—Sheet 2.
J. KENNEDY.
MANUFACTURE OF EYE BARS.
No. 395,239. Patented Dec. 25, 1888.
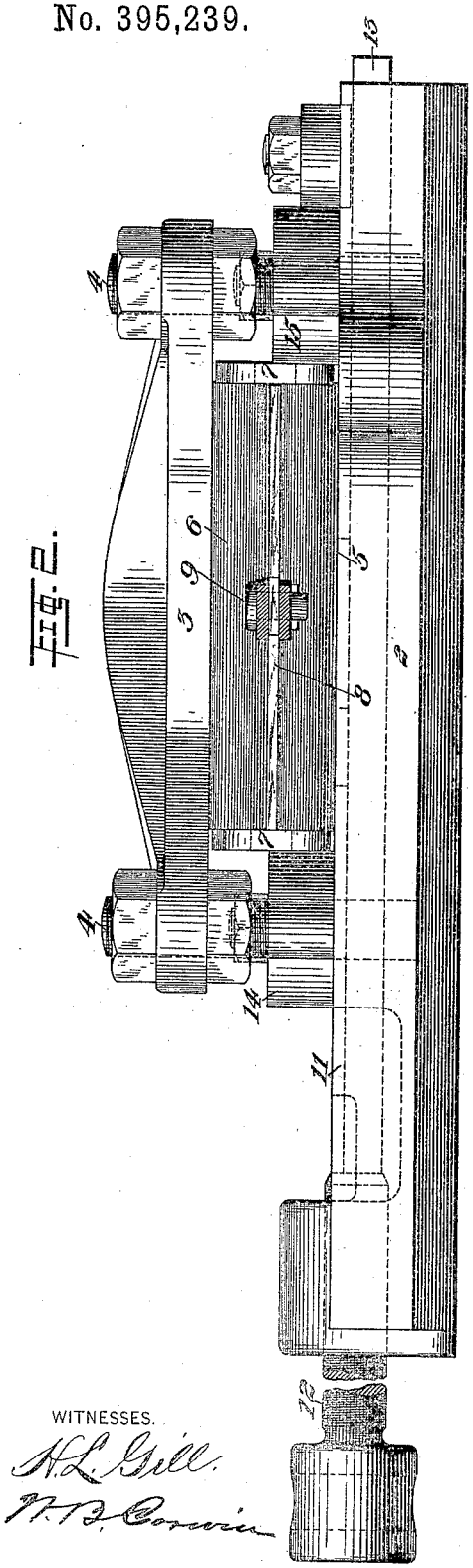
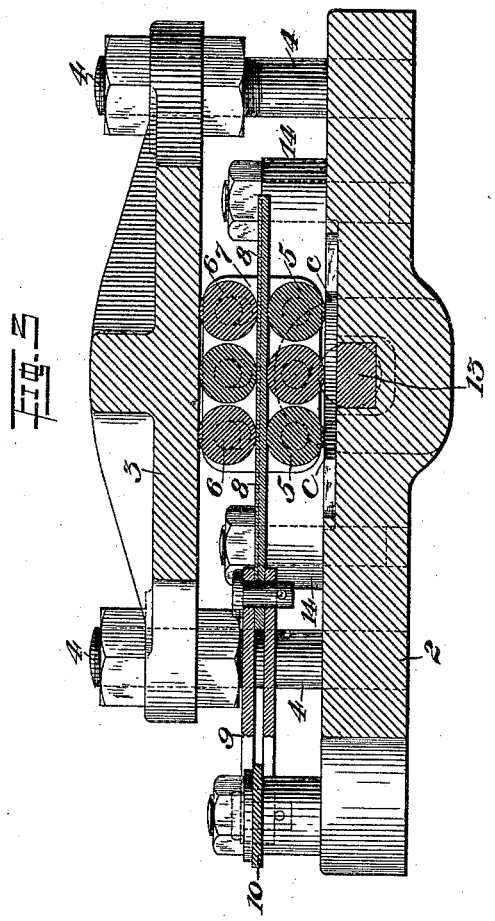
WITNESSES.
H. L. Gill.
N. B. Corwin.
INVENTOR.
Julian Kennedy.
by W. Bakewell & Sons
his attorneys

UNITED STATES PATENT OFFICE.

JULIAN KENNEDY, OF HOMESTEAD, PENNSYLVANIA.

MANUFACTURE OF EYE-BARS.

SPECIFICATION forming part of Letters Patent No. 395,239, dated December 25, 1888.

Application filed April 7, 1888. Serial No. 269,933. (No model.)

*To all whom it may concern:*

Be it known that I, JULIAN KENNEDY, of Homestead, in the county of Allegheny and State of Pennsylvania, have invented a new and useful Improvement in the Manufacture of Eye-Bars, &c.; and I do hereby declare the following to be a full, clear, and exact description thereof, reference being had to the accompanying drawings, forming part of this specification, in which—

Figure 1 is a plan view of a machine which is adapted for the practice of my improved method of upsetting eye-bars, the top plate being indicated in outline by dotted lines for the purpose of making the parts below clearly visible. Fig. 2 is a front view thereof. Fig. 3 is a vertical cross-section on the line A B C D of Fig. 1.

Like symbols of reference indicate like parts in each.

My invention is designed to afford a new and improved method for spreading or enlarging the ends of eye-bars; and its object is to obviate certain disadvantages which have been incident to the methods heretofore employed for this purpose, to improve the quality of the finished bars, and to enable them to be spread with less power than has heretofore been possible. Heretofore it has been the common practice to upset these bars in a machine wherein the bar is held between two fixed dies or plates bearing on the flat sides of the bar, above and below, the upsetting being done by a moving die or plunger which works between the top and bottom dies. It is obvious that in this method the friction of metal in spreading out is very considerable, the bars must be brought to a high heat, which is very injurious to steel bars, and great power must be employed to upset the bar, especially when it is thin and the space between the top and bottom die-plates correspondingly narrow. The parts of the machine must therefore be made of inconvenient weight and strength to resist the great strain which is thus put on them. Beside this, these prior methods have been positively injurious to the bars, because the upsetting of the metal by a force exerted in a line with its length distorts the crystalline structure of the end of the bar and impairs its strength.

As distinguished from methods of this kind my invention consists in a method wherein the bar is spread by the combined action of an upsetting die or plunger, which acts upon the end of the bar, and a roll or rolls which act upon the surface of the bar in a direction transverse to the line of action of the plunger. The spreading of the head is thus effected by a cross-rolling action, while the function of the plunger is to thicken up the metal and to feed it to the rolls. The power necessary to be employed in this upsetting operation is comparatively small, the bar need not be heated to an excessively high temperature, and the effect of the rolling is not at all to impair the quality of the metal, as in cases where the upsetting is done solely by the direct action of a plunger.

Referring now to the drawings, 2 represents the bed of the machine, and 3 represents a top plate, which is secured to the bed by suitable bolts and nuts, 4. Between the top plate, 3, and the bed 2 is a system of rolls, 5 and 6, which are arranged with their axes parallel to each other, and are provided at their ends with gudgeons, which fit in sockets in vertical end plates or carriers, 7. I show two series of these rolls. They are held together in the manner of a carriage by the end plates, 7, and are adapted to travel transversely in the space between the bed on which the bottom rolls, 5, rest, and the top plate, which rests upon the top rolls, 6. The arrangement and mechanical operation of these rolls do not form an essential feature of my invention. They can be varied in many ways, and any number of rolls, greater or less than shown in the drawings, may be employed. As a convenient and effective way of operating them, I employ a plate, 8, which fits between the two series of rolls, as shown in Fig. 3, and at the side of the machine is connected by a link, 9, to a lever, 10, which is oscillated by any suitable power mechanism, and which causes the plate 8 to reciprocate horizontally between and in contact with the two series of rolls. Beneath the lower series of rolls, 5, the bed of the machine is cut out or recessed to afford a space, in which the bar rests when it is under treatment, the space being enlarged at the middle of the bed, and shaped, as shown by dotted lines, to afford a die-cavity, *b*, for the formation of the neck of the eye-bar head, and having an enlarged space in front of this die-cavity and in the same horizontal plane therewith, within which cavity the moving die acts. The moving die 11 consists of a plate of steel arranged to move within the recess of the bed-plate against the end of the bar which is to be spread, and at its end it is provided with a recess, c, which is the counterpart of the die-cavity b, and is of proper shape to form the head of the desired outline. The die 11 is actuated by a screw, 12, or by a suitable hydraulic plunger, and is preferably guided and steadied in its motion by a tongue, 13, which extends from end to end of the machine in a groove which is adapted to permit its free longitudinal motion. The die and its tongue are held in place by bridge-pieces 14 and 15, which are bolted to the machine-bed. The cross-pieces 15 are suitably recessed to permit the insertion of the metal bar into the machine.

The operation of the machine is as follows: The metal bar, having been heated to the proper heat for upsetting, is inserted into the recess of the bed-plate beneath the rolls 5, with its end in the enlargement of the recess at the middle of the machine and in contact with the formative end of the moving die 11, and is held in that position by any suitable device used for such purposes. The moving die is now advanced by action of the screw or plunger 12, and the plate 8 is at the same time caused to reciprocate. The action of the plunger on the hot bar tends to thicken up and slightly to spread its end, and the rolls 5, simultaneously traveling back and forth over the hot bar and pressing thereon, spread out laterally the metal which is thickened up by the plunger. This lateral spreading of the metal by the cross action of the rolls is continued as the plunger advances until it reaches the end of the enlarged cavity, and in conjunction with the recess b completes the formation of the head. When the head has been completely formed, the bridge-pieces 15 are raised and the eye-bar removed from the machine.

The advantages of my improved method will be appreciated by those skilled in the art. The mechanical power used in its practice is comparatively small, it affords means whereby the bars can be upset quickly and with little cost, and from the nature of the treatment to which the bar is subjected by the rolls the metal is not injuriously affected by the formation of the head.

As I have already indicated, my invention is not dependent upon any specific construction of the machine, which may be greatly varied by the skilled mechanic in form, proportions, and arrangement of parts. This is so particularly with regard to the arrangement of the rolls. For example, instead of arranging them to act upon one side only of the bar, they may be arranged on both sides thereof, and many other modifications will suggest themselves.

I claim as my invention—

1. An improvement in the art of spreading metal bars, which consists in subjecting a bar to a combined upsetting and cross-rolling, substantially as and for the purposes described.

2. An improvement in the art of spreading metal bars, which consists in compressing or upsetting the end or edge of the bar between dies which determine the shape of the finished head, and at the same time cross-rolling the bar, substantially as and for the purposes described.

In testimony whereof I have hereunto set my hand this 4th day of April, A. D. 1888.

JULIAN KENNEDY.

Witnesses:
W. B. CORWIN,
J. K. SMITH.